(12) United States Patent
Umehara (10) Patent No.: US 12,467,654 B2
(45) Date of Patent: Nov. 11, 2025

(54) AIR CONDITIONER WITH SWITCHES FOR ALLOWING AN INRUSH CURRENT

(71) Applicant: Mitsubishi Electric Corporation, Tokyo (JP)

(72) Inventor: Shigeo Umehara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 186 days.

(21) Appl. No.: 18/255,123

(22) PCT Filed: Feb. 18, 2021

(86) PCT No.: PCT/JP2021/006164
§ 371 (c)(1),
(2) Date: May 31, 2023

(87) PCT Pub. No.: WO2022/176120
PCT Pub. Date: Aug. 25, 2022

(65) Prior Publication Data
US 2024/0102686 A1    Mar. 28, 2024

(51) Int. Cl.
*F24F 11/88*    (2018.01)
*F24F 11/30*    (2018.01)

(52) U.S. Cl.
CPC ............. *F24F 11/88* (2018.01); *F24F 11/30* (2018.01); *F25B 2500/26* (2013.01)

(58) Field of Classification Search
CPC ................................................. F25B 2500/26
See application file for complete search history.

(56) References Cited

U.S. PATENT DOCUMENTS

| 8,987,947 B2 | 3/2015 | Higashiyama et al. |
| 2015/0008762 A1* | 1/2015 | Higashiyama ............ F24F 1/20 307/113 |
| 2016/0131387 A1* | 5/2016 | Sawada .................... F24F 11/46 62/158 |

FOREIGN PATENT DOCUMENTS

| JP | 2010-243051 A | 10/2010 | |
| JP | 4833168 B2 * | 12/2011 | ............. F24F 11/02 |
| JP | 2013-137116 A | 7/2013 | |
| JP | 2015-055450 A | 3/2015 | |

OTHER PUBLICATIONS

International Search Report of the International Searching Authority mailed Mar. 30, 2021 in corresponding International Application No. PCT /JP2021/006164 (and English translation).

* cited by examiner

*Primary Examiner* — Jerry-Daryl Fletcher
*Assistant Examiner* — Daniel C Comings
(74) *Attorney, Agent, or Firm* — Posz Law Group, PLC (57) ABSTRACT

An air conditioner includes an indoor and outdoor units connected by a power supply line, a common line, and a signal line. The indoor unit includes a first switch for connection between the power supply line and the signal line, and the outdoor unit includes: a second switch for connection between the power supply line and the outdoor unit; a smoother; and a third switch to connect the signal line and a resistor when in an off state, and be open when in an on state, the resister being connected to the second switch. When the outdoor unit starts, the first switch is turned on with the third switch in the off state to allow flow of an inrush current for charging the smoother and, after which, the second switch is turned on and subsequently the first switch is turned off and the third switch is turned on.

7 Claims, 7 Drawing Sheets

AIR CONDITIONER WITH SWITCHES FOR ALLOWING AN INRUSH CURRENT

CROSS REFERENCE TO RELATED APPLICATION

This application is a U.S. national stage application of PCT/JP2021/006164 filed on Feb. 18, 2021, the contents of which are incorporated herein by reference.

FIELD

The present disclosure relates to an air conditioner including an indoor unit and an outdoor unit.

BACKGROUND

Conventional air conditioners have outdoor and indoor units connected to each other through power lines for transmission of AC power from AC power supplies, signal lines for signal transmission, and common lines for use in the the AC-power transmission and the signal transmission for the purpose of reducing standby power consumption.

An indoor unit of an air conditioner described in Patent Literature 1 includes an indoor control circuit and a first switch switchable under control of the indoor control circuit between an on state to connect a signal line and a power line to each other and an off state to disconnect the signal line and the power line from each other. Meanwhile, an outdoor unit of the air conditioner described in Patent Literature 1 includes an outdoor control circuit including a main relay, and a second switch switchable under control of the outdoor control circuit between an on state to connect the outdoor control circuit to an AC power supply and an off state to connect the outdoor control circuit to the signal line. The indoor control circuit switches the first switch to an on state with the second switch in an off state to thereby start the outdoor control circuit. After that, the outdoor control circuit switches the second switch to an on state and subsequently the indoor control circuit switches the first switch to an off state, which starts the outdoor unit, such that standby power consumption of the outdoor unit is reduced.

PATENT LITERATURE

Patent Literature 1: Japanese Patent Application Laid-open No. 2013-137116

Unfortunately, the technique of Patent Literature 1 above is required to have an additional circuit dedicated to preventing an inrush current, because the inrush current flows through a large-capacity smoother connected to the outdoor unit when the main relay is turned on in order to bring the outdoor unit into operation. For this reason, the size of the air conditioner is so large that a high cost is needed to make the air conditioner.

SUMMARY

The present disclosure has been made in view of the above, and aims to provide an air conditioner that can be made at low cost.

In order to solve the above problem and achieve an object, the present disclosure provides an air conditioner including an indoor unit and an outdoor unit, the indoor unit and the outdoor unit being connected to each other by three cores made up of a power supply line, a common line, and a signal line, the indoor and outdoor units being powered by a commercial power supply via the power supply line and the common line, the commercial power supply being provided for one of the outdoor unit and the indoor unit. The indoor unit includes: a first switch to open and close a connection between the power supply line and the signal line; and an indoor controller to operate the first switch to supply an AC voltage from the commercial power supply between the signal line and the power line. The outdoor unit includes: a second switch to open and close a connection between the power supply line and the outdoor unit; a rectifier connected to a subsequent stage to the second switch to rectify the AC voltage; a smoother to smooth an output of the rectifier; a third switch to connect the signal line and a resistor to each other when the third switch is in an off state, and be open when the third switch is in an on state, the resister being connected to the subsequent stage to the second switch; and an outdoor controller to control the second switch and the third switch. In starting the outdoor unit from a standby mode into operation, the indoor controller and the outdoor controller turn on the first switch with the third switch in the off state to thereby allow an inrush current to flow through the smoother of the outdoor unit via the indoor unit for charging the smoother and, after charging the smoother, turn on the second switch and subsequently turn off the first switch and turn on the third switch.

The air conditioner according to the present disclosure can be made at low cost.

DETAILED DESCRIPTION

An air conditioner according to embodiments of the present disclosure will be hereinbelow described in detail with reference to the drawings.

First Embodiment

Figure 1:
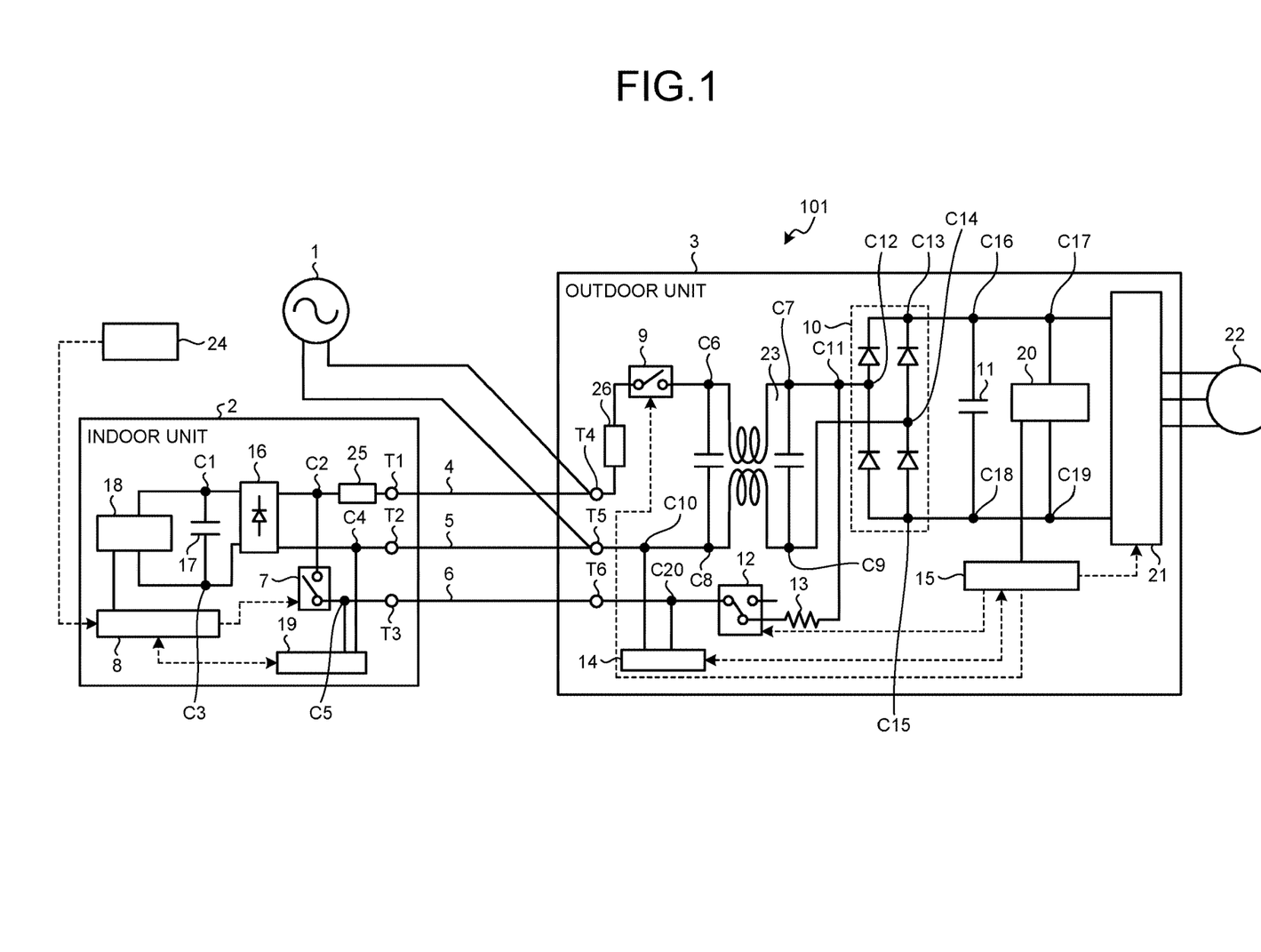
FIG. 1 is a diagram illustrating an example configuration of an air conditioner according to a first embodiment.

FIG. 1 is a diagram illustrating an example configuration of an air conditioner according to a first embodiment. An air conditioner 101 during standby shuts off power supply to a control circuit (outdoor controller 15) of an outdoor unit 3 in order to reduce standby power consumption. The air conditioner 101 includes an indoor unit 2 and the outdoor unit 3.

An AC power supply 1, which is a commercial power supply, is connected to the outdoor unit 3. Note that, although FIG. 1 illustrates the AC power supply 1 connected to the outdoor unit 3, the AC power supply 1 may be connected to the indoor unit 2. Further, the AC power supply 1 is a single-phase AC power supply, but may be a three-phase AC power supply. In the air conditioner 101, the indoor unit 2 and the outdoor unit 3 are connected by three cores made up of a power supply line 4, a common line 5, and a signal line 6.

The indoor unit 2 includes a first switch 7, an indoor controller 8, an indoor rectifier 16, an indoor smoother 17, an indoor control power generator 18, an indoor communication circuit 19, and an indoor current fuse 25. The indoor unit 2 also includes terminals T1 to T3.

The outdoor unit 3 includes a second switch 9, an outdoor rectifier 10, an outdoor smoother 11, a third switch 12, a resistor 13, an outdoor communication circuit 14, the outdoor controller 15, an outdoor control power generator 20, an inverter circuit 21, a noise filter 23, and an outdoor current fuse 26. The outdoor unit 3 also includes terminals T4 to T6.

The power supply line 4 is connected to the terminals T1 and T4, the common line 5 is connected to the terminals T2 and T5, and the signal line 6 is connected to the terminals T3 and T6. The power supply line 4 is connected to the AC power supply 1 via the terminal T4, and the common line 5 is connected to the AC power supply 1 via the terminal T5.

In the indoor unit 2, the terminal T1 is connected to the indoor current fuse 25, the terminal T2 is connected to a connection point C4, and the terminal T3 is connected to a connection point C5.

In the indoor unit 2, the indoor current fuse 25 has one end connected to the terminal T1 connected to the power supply line 4, and the other end connected to a connection point C2. The indoor current fuse 25 blows when a current exceeding an allowable current continuously flows therethrough.

The first switch 7 is connected via the connection point C2, the indoor current fuse 25, and the terminal T1 to the power supply line 4, and is connected via the connection point C5 and the terminal T3 to the signal line 6. In other words, the first switch 7 is connected to a line that connects the power supply line 4 and the signal line 6 to each other via the indoor current fuse 25.

The first switch 7 short-circuits the power supply line 4 and the signal line 6 in response to an on command from the indoor controller 8, and releases the connection between the power supply line 4 and the signal line 6 in response to an off command from the indoor controller 8. The first switch 7 may be an A-contact relay which is an A-contact mechanical relay, or may be made of a semiconductor.

The indoor rectifier 16 has one end portion connected to a connection point C1 and the connection point C2, and the other end portion connected to a connection point C3 and the connection point C4. The indoor rectifier 16 rectifies the voltage of the AC power supply 1 and outputs the rectified voltage. The indoor rectifier 16 is configured using a diode.

The indoor smoother 17 is connected to the connection points C1 and C3. The indoor smoother 17 is a smoothing capacitor, for example. The indoor smoother 17 smooths a voltage output from the indoor rectifier 16.

The indoor control power generator 18 is connected to the connection points C1 and C3. The indoor control power generator 18 generates a low DC voltage from a voltage smoothed by the indoor smoother 17. Note that, the indoor control power generator 18 is not limited in terms of its configuration and method, and may be a DC/DC converter using a switching transformer or may be a step-down converter that directly steps down a voltage.

The indoor controller 8 is connected to a remote controller 24. The indoor controller 8 receives a command transmitted from the remote controller 24. In addition, the indoor controller 8 is connected to the indoor control power generator 18, the first switch 7, and the indoor communication circuit 19.

The indoor controller 8 is configured using a microcomputer or the like. The indoor controller 8 operates with a voltage generated by the indoor control power generator 18 and controls the indoor unit 2. Specifically, the indoor controller 8 controls the first switch 7 and the indoor communication circuit 19.

The indoor communication circuit 19 is connected via the connection point C4 and the terminal T2 to the common line 5, and is connected via the connection point C5 and the terminal T3 to the signal line 6. The indoor communication circuit 19 transmits a change in potential to the indoor controller 8 and changes a potential according to the operation of the indoor controller 8 so that the indoor controller 8 and the outdoor controller 15 can communicate with each other.

In the outdoor unit 3, the terminal T4 is connected to the outdoor current fuse 26, the terminal T5 is connected to a connection point C10, and the terminal T6 is connected to a connection point C20.

In the outdoor unit 3, the outdoor current fuse 26 has one end connected to the terminal T4, and the other end connected to the second switch 9. In other words, the second switch 9 is connected to the power supply line 4 via the outdoor current fuse 26 and the terminal T4. In addition, the second switch 9 is connected to a connection point C6.

The second switch 9 is opened and closed by the outdoor controller 15. The second switch 9 may be an A-contact relay which is an A-contact mechanical relay, or may be made of a semiconductor. The noise filter 23, which reduces normal mode noise and common mode noise, is connected to a subsequent stage of the second switch 9. The noise filter 23 is connected to connection points C6 to C9. The configuration of the noise filter 23 is not limited, but the noise filter 23 includes, for example, an X capacitor, a Y capacitor (not illustrated), and the like.

FIG. 1 illustrates the noise filter 23 including two capacitors and two coils. In the noise filter 23, the first capacitor is connected to the connection points C6 and C8, and the second capacitor is connected to the connection points C7 and C9. In addition, in the noise filter 23, the first coil is connected to the connection points C6 and C7, and the second coil is connected to the connection points C8 and C9. The connection point C7 is connected to a connection point C11, the connection point C8 is connected to the connection point C10, and the connection point C9 is connected to a connection point C14.

The outdoor rectifier 10 is connected to a subsequent stage to the noise filter 23 and rectifies the AC voltage of the AC power supply 1. Specifically, the outdoor rectifier 10 is connected to the connection points C9 and C11 and connection points C16 and C18. FIG. 1 illustrates the outdoor rectifier 10 that is a single-phase AC bridge diode including four diodes.

The outdoor rectifier 10 includes connection points C12 to C15. In the outdoor rectifier 10, the first diode is connected to the connection points C12 and C13, the second diode is connected to the connection points C12 and C15, the third diode is connected to the connection points C13 and C14, and the fourth diode is connected to the connection points C14 and C15.

With such a configuration, the outdoor rectifier 10 has the first diode connected to the second diode via the connection point C12, and the third diode connected to the fourth diode via the connection point C14. The connection point C12 is connected to the connection point C11, and the connection point C14 is connected to the connection point C9. Further, the connection point C13 is connected to a connection point C16, and the connection point C15 is connected to a connection point C18.

The outdoor smoother 11 is connected to the connection points C16 and C18. The outdoor smoother 11 smooths the output of the outdoor rectifier 10. The outdoor rectifier 10 and the outdoor smoother 11 are full-wave rectifying circuits in FIG. 1, but are not limited to these. The outdoor rectifier 10 and the outdoor smoother 11 may include a coil and a switching element, may be a rectifying circuit that controls a power factor, or may be a rectifying circuit that controls a DC voltage across the outdoor smoother 11. The connection point C16 is connected to a connection point C17, and the connection point C18 is connected to a connection point C19.

The outdoor control power generator 20 is connected to the connection points C17 and C19. The outdoor control power generator 20 generates a low DC voltage from a high voltage transmitted via the outdoor smoother 11. The outdoor control power generator 20 is not limited in terms of its configuration and method, and may be a DC/DC converter using a switching transformer or may be a step-down converter that directly steps down a voltage.

The outdoor controller 15 is connected to the outdoor control power generator 20. In addition, the outdoor controller 15 is connected to and controls the third switch 12, the second switch 9, the outdoor communication circuit 14, and the inverter circuit 21. The outdoor controller 15 is configured using a microcomputer or the like. The outdoor controller 15 is driven by the voltage of the outdoor control power generator 20, and controls the inverter circuit 21 to convert a DC voltage across the outdoor smoother 11 into a three-phase AC voltage and drive a compressor motor 22. Although not illustrated in FIG. 1, the outdoor controller 15 is also connected to an actuator used for a fan motor, a four-way valve, a linear expansion valve (LEV, electronic linear expansion valve), and the like, a sensor such as a thermistor, and the like, and may control the entire outdoor unit 3.

The inverter circuit 21 is connected to the connection points C17 and C19. In addition, the inverter circuit 21 is connected to the compressor motor 22. The inverter circuit 21 generates a three-phase alternating current to rotate the compressor motor 22.

The third switch 12 may be a C-contact relay which is a C-contact mechanical relay, or may be made of a semiconductor. The third switch 12 has a normally closed contact connected to the connection point C20. The third switch 12 has a normally opened contact connected to nothing, and has a movable part contact connected to one end of the resistor 13. The connection point C20 is connected to the terminal T6 connected to the signal line 6.

The other end of the resistor 13 is connected to the connection point C11 which is a subsequent stage to the second switch 9. The outdoor communication circuit 14 is connected to the common line 5 via the connection point C10, and is connected to the signal line 6 via the connection point C20. The outdoor communication circuit 14 transmits a change in potential to the outdoor controller 15 and changes a potential according to the operation of the outdoor controller 15 so that the indoor unit 2 and the outdoor unit 3 can communicate with each other.

Figure 2:
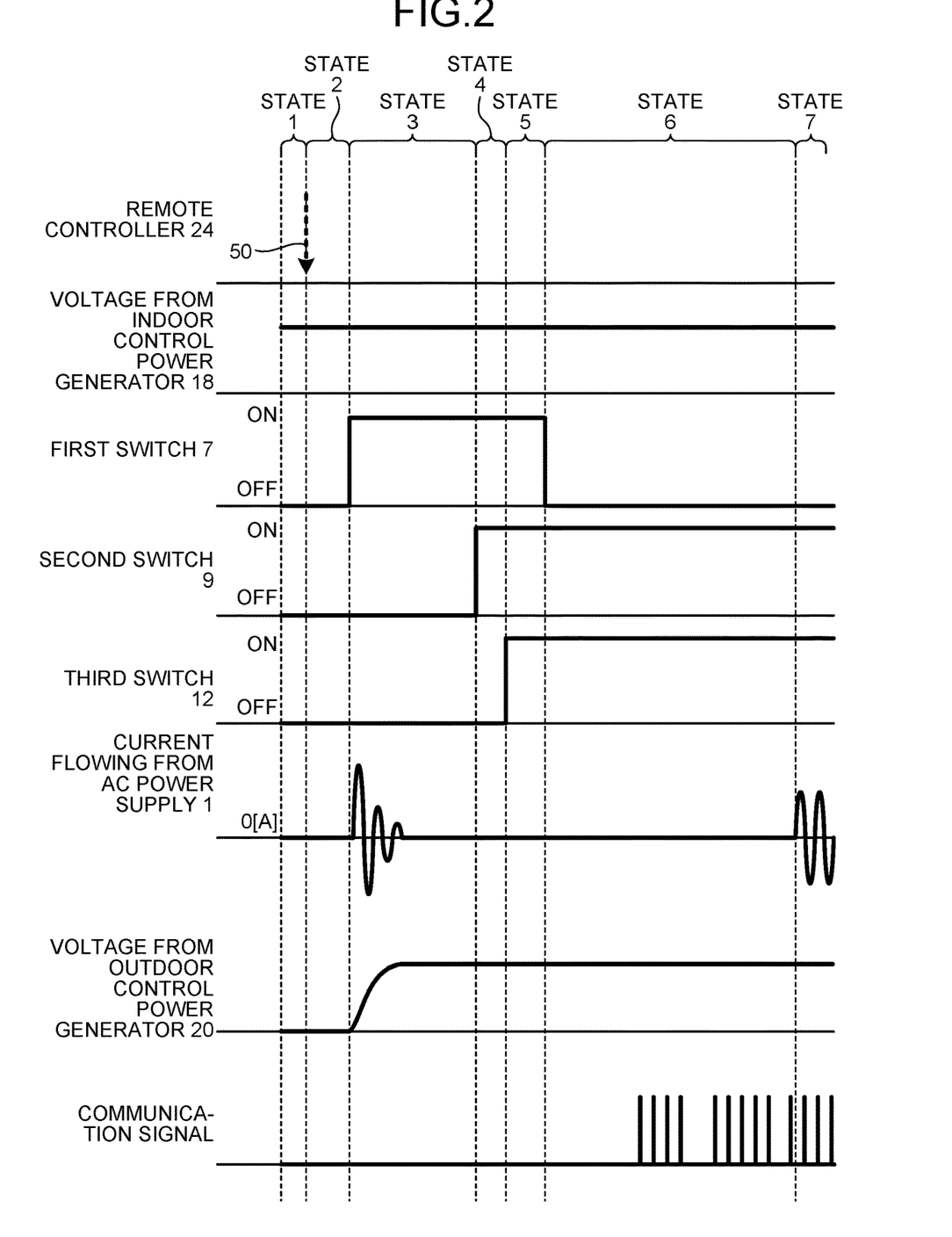
FIG. 2 is a time chart illustrating an operation procedure of the air conditioner according to the first embodiment.

Next, the operation of the air conditioner 101 will be described. FIG. 2 is a time chart illustrating an operation procedure of the air conditioner according to the first embodiment. The operation of the air conditioner 101 observed when the outdoor unit 3 is operated starting from a standby mode of the air conditioner 101 will be described herein.

An arrow 50 illustrated in FIG. 2 indicates a timing at which a user operates the remote controller 24. A state 1 is a state observed before the user operates the remote controller 24. In the state 1, the AC power supply 1 is energized to the indoor unit 2. This state 1 indicates the following situations (1-1) to (1-9).

(1-1) The indoor control power generator 18 generates power.
(1-2) The indoor controller 8 is operating and waiting for a signal from the remote controller 24. However, since the indoor controller 8 does not need operating other than reception of signals from the remote controller 24, the indoor controller 8 maintains minimum power consumption by performing an operation with minimum functions.
(1-3) The first switch 7 is in an off state, and the power supply line 4 and the signal line 6 are open.
(1-4) The second switch 9 is in an off state, and the AC power supply 1 is not energized to stages subsequent to the second switch 9 of the outdoor unit 3.
(1-5) The third switch 12 is in an off state, and has a contact connected to a normally closed contact side. That is, the third switch 12 connects the resistor 13 and the connection point C20 to each other.
(1-6) No current flows through the AC power supply 1.
(1-7) A very small current equivalent to the standby power of the indoor unit 2 flows in the air conditioner 101.
(1-8) The outdoor control power generator 20 is not operating, and power is not supplied to the outdoor controller 15.
(1-9) No communication is performed between the common line 5 and the signal line 6.

Note that, since the noise filter 23 of the first embodiment is connected to the subsequent stage to the second switch 9, no voltage is applied thereto although the noise filter 23 includes the X capacitor, and thus no reactive current flows therethrough. In other words, the air conditioner 101 can set 0[A] of both reactive power and standby power flowing to the outdoor unit 3.

The air conditioner 101 transitions to a state 2 after the state 1. This state 2 indicates the following situation (2-1).

(2-1) The indoor controller 8 transitions from a state where standby power consumption is minimum to a normal mode for preparation of operation. As a result, a current flowing through the AC power supply 1 slightly increases but is very small, and thus, is not illustrated in FIG. 2. In addition, at this time, the air conditioner 101 may operate a fan (not illustrated) of the indoor unit 2.

The air conditioner 101 transitions to a state 3 after the state 2. This state 3 indicates the following situations (3-1) to (3-4).

(3-1) The indoor controller 8 turns on the first switch 7. That is, the indoor controller 8 short-circuits the power supply line 4 and the signal line 6. As a result, an inrush current flows in a path illustrated in FIG. 3.

Figure 3:
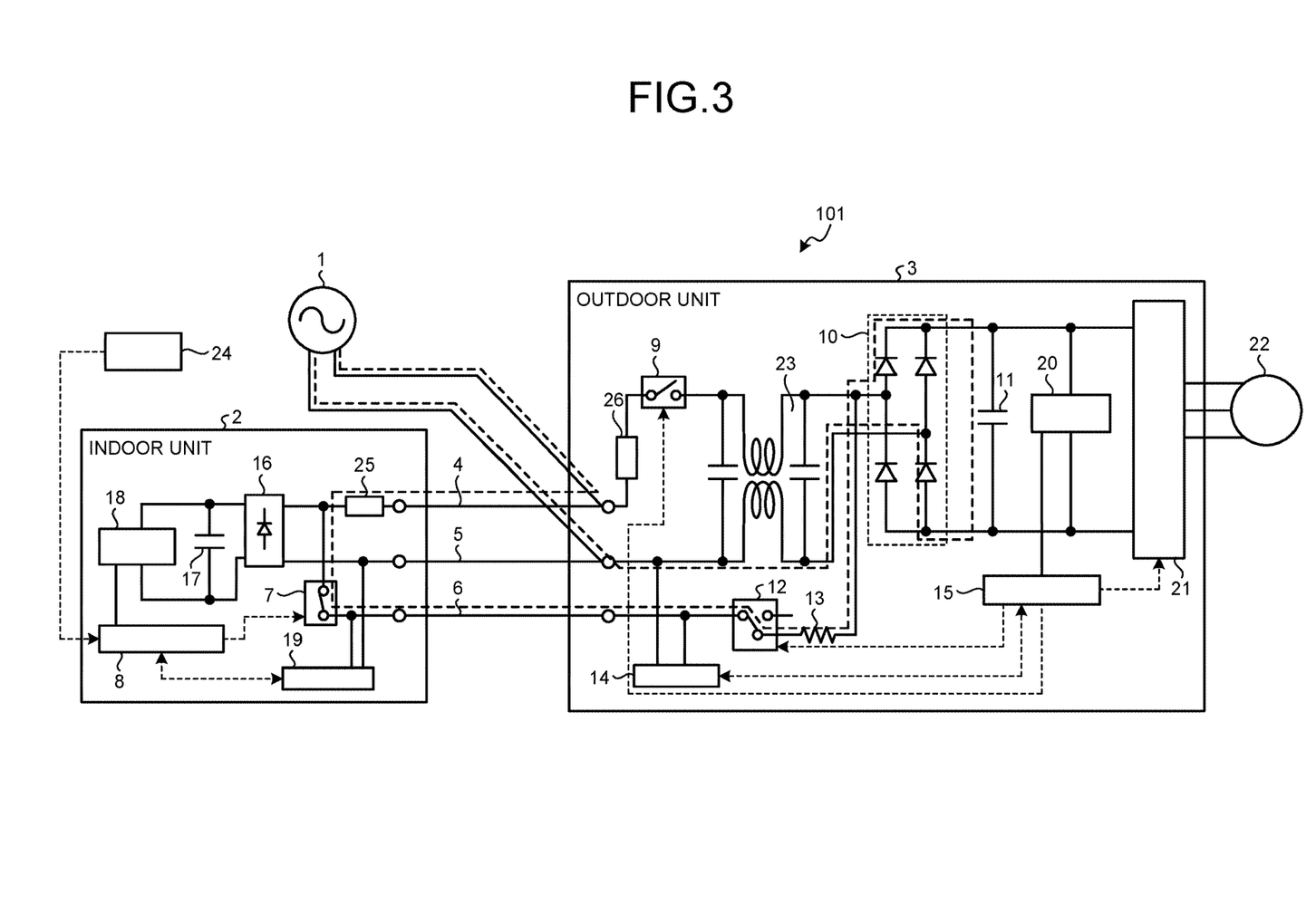
FIG. 3 is a diagram for illustrating how an inrush current flows at the time of start-up of an outdoor unit included in the air conditioner according to the first embodiment.

FIG. 3 is a diagram for illustrating how an inrush current flows at the time of start-up of the outdoor unit of the air conditioner according to the first embodiment. FIG. 3 illustrates a path of an inrush current flowing through the outdoor unit 3 at the time of start-up of the outdoor unit 3. Note that reference signs of the connection points C1 to C20 and the terminals T1 to T6 are omitted in FIG. 3 and FIG. 4 as will be described later.

When the first switch 7 is turned on at the time of start-up of the outdoor unit 3, the power supply line 4 and the signal line 6 are connected to each other. As a result, the outdoor smoother 11 is charged as a current flows through the AC power supply 1, the power supply line 4, the indoor current fuse 25, the first switch 7, the signal line 6, the third switch 12, the resistor 13, the outdoor rectifier 10, the outdoor smoother 11, the outdoor rectifier 10, the common line 5 side of the noise filter 23, and the AC power supply 1 in this order (the current takes a reverse path when a current phase of the AC power supply 1 is opposite).

The resistor 13 functions as a limiting resistor that prevents an inrush current when the outdoor smoother 11 is charged. Note that, the resistor 13 may be a positive temperature coefficient (PTC, thermistor). For example, even when a current flows more than a normal inrush current with the outdoor smoother 11, the inverter circuit 21, etc. short-circuited, the resistance value of the PTC becomes very large with an increase in temperature. AS a result, the air conditioner 101 can limit the current and reduce the risk of burning the resistor 13.

(3-2) The outdoor control power generator 20 generates control power.

(3-3) After power is supplied from the outdoor control power generator 20 to the outdoor controller 15, the outdoor controller 15 performs a rising process for preparation of start.

(3-4) After an inrush current flows, the current of the AC power supply 1 flows in the amount corresponding to power consumption of the outdoor controller 15 etc. and standby power of the inverter circuit 21 etc. and, where the noise filter 23 includes the X capacitor, to the amount of reactive power, which is not illustrated in FIG. 2.

Note that, the first switch 7 of the indoor unit 2 can be any switch having such a capacity that the switch will not be broken by the inrush current and the normal current of the indoor unit 2. In addition, the indoor current fuse 25 can be any current fuse having such a capacity that the current fuse will blow not due to the inrush current and the normal current of the indoor unit 2 but when a current exceeding the allowable current of the indoor unit 2 flows.

In the first embodiment, as described above, an inrush current flowing through the outdoor unit 3 flows through the first switch 7 and the indoor current fuse 25. Thus, the first switch 7 has inrush current tolerance and specifications, which indicate a capacity high enough to withstand an inrush current flowing when the outdoor unit 3 starts. In addition, the indoor current fuse 25 has such a capacity and specifications that the indoor current fuse 25 will blow not due to an instantaneous current such as the inrush current of the outdoor unit 3 but when a current exceeding the allowable current of the indoor unit 2 continuously flows.

The air conditioner 101 transitions to a state 4 after the state 3. This state 4 indicates the following situation (4-1).

(4-1) The outdoor controller 15 turns on the second switch 9. Although not illustrated in FIG. 2, the current of the AC power supply 1 then increases by the amount corresponding to power consumption for driving the second switch 9.

The air conditioner 101 transitions to a state 5 after the state 4. This state 5 indicates the following situation (5-1).

(5-1) The outdoor controller 15 turns on the third switch 12 to thereby open the contact of the third switch 12. Although not illustrated in FIG. 2, the current of the AC power supply 1 then increases by the amount corresponding to power consumption for driving the third switch 12.

The air conditioner 101 transitions to a state 6 after the state 5. This state 6 indicates the following situation (6-1).

(6-1) The indoor controller 8 turns off first switch 7 to thereby open the power supply line 4 and the signal line 6. As a result, the indoor communication circuit 19 and the outdoor communication circuit 14 can communicate with each other via the common line 5 and the signal line 6.

As described in relation to the states 5 and 6, the third switch 12 and the first switch 7 are switched so that the third switch 12 is turned on and subsequently the first switch 7 is turned off, but the order of switching the third switch 12 and the first switch 7 is not limited to this order. After turning on the second switch 9 in the state 4, the air conditioner 101 may perform the process of turning on the third switch 12 and the process of turning off the first switch 7 in the reverse order or may turn on the third switch 12 and off the first switch 7 at the same time.

In some case, for example, the indoor controller 8 side, which is a master, first transmits a communication signal to the outdoor controller 15 side, which is a slave, for communication between the indoor controller 8 and the outdoor controller 15. In this case, the air conditioner 101 turns on the third switch 12 and subsequently off the first switch 7, following which the indoor controller 8 may start communication from the indoor communication circuit 19.

In another example, the outdoor controller 15 side, which is a master, first transmits a communication signal to the indoor controller 8 side, which is a slave. In this case, the air conditioner 101 turns off the first switch 7 and subsequently on the third switch 12, following which the outdoor controller 15 may start communication from the outdoor communication circuit 14.

Regardless of whether the indoor communication circuit 19 or the outdoor communication circuit 14 starts the communication, the air conditioner 101 is configured to start communication provided that the first switch 7 is in an off state and the third switch 12 is in an on state.

When the outdoor communication circuit 14 performs the communication operation with the first switch 7 in an on state, a short circuit occurs between the potentials of the common line 5 and the signal line 6. With the first switch 7 in an on state, the signal line 6 has the same potential as the power supply line 4. As a result, the power supply will be short-circuited causing the circuit failure as a current flows through the AC power supply 1, the power supply line 4, the indoor current fuse 25, the first switch 7, the indoor communication circuit 19, the common line 5, and the AC power supply 1 in this order.

With the third switch 12 in an off state, the indoor communication circuit 19 attempts to start communication, in which case nothing happens if the second switch 9 is in an off state. However, if the second switch 9 is in an on state, the power supply will be short-circuited. In other words, the power supply will be short-circuited as a current flows through the AC power supply 1, the outdoor current fuse 26, the second switch 9, the noise filter 23, the resistor 13, the third switch 12, the signal line 6, the indoor communication circuit 19, the common line 5, and the AC power supply 1 in this order. When the outdoor controller 15 turns on the third switch 12 with such a current flowing, an arc is generated at the contact, which causes deterioration in life of the contact, welding, etc. Thus, in the first embodiment, the air conditioner 101 starts communication when the first switch 7 is in an off state and the third switch 12 is in an on state.

The air conditioner 101 transitions to a state 7 after the state 6. This state 7 indicates the following situation (7-1).

Figure 4:
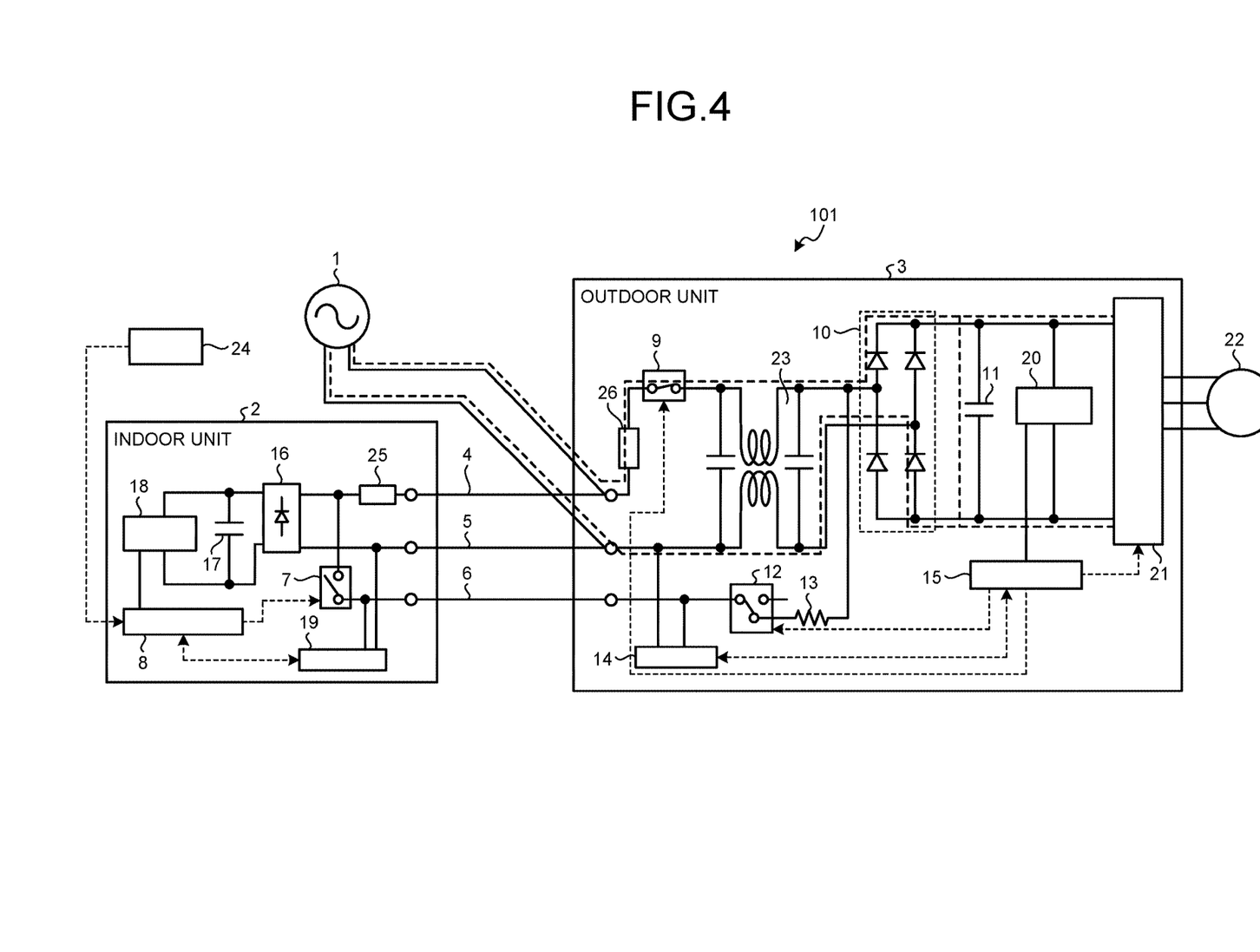
FIG. 4 is a diagram for illustrating how a current flows during the normal operation of the air conditioner according to the first embodiment.

(7-1) The outdoor controller 15 starts an operation, and a current flows from the AC power supply 1. FIG. 4 illustrates how a current flows during a normal operation.

FIG. 4 is a diagram for illustrating how a current flows during the normal operation of the air conditioner according to the first embodiment. In the normal operation of the air conditioner 101, a current flows through the AC power supply 1, the outdoor current fuse 26, the second switch 9, the power supply line 4 side of the noise filter 23, the outdoor rectifier 10, the outdoor smoother 11, the inverter circuit 21, the compressor motor 22, the inverter circuit 21, the outdoor smoother 11, the outdoor rectifier 10, the common line 5 side of the noise filter 23, and the AC power supply 1 in this order. Meanwhile, the current flows in a reverse path when the current phase of the AC power supply 1 is opposite. Note that, a current for operating the actuator also flows through the indoor unit 2.

As discussed above, when starting the outdoor unit 3, the air conditioner 101 allows an inrush current to flow through the outdoor smoother 11 via the first switch 7 and the resistor 13 provided at a subsequent stage to the third switch 12. In other words, when starting the outdoor unit 3, the air conditioner 101 allows an inrush current to flow through the outdoor smoother 11, which is a smoother of the main circuit of the outdoor unit 3, via the first switch 7 of the indoor unit 2.

Accordingly, the air conditioner 101 does not need to use a circuit dedicated to preventing an inrush current. The air conditioner 101 does not need to use a circuit component dedicated to preventing an inrush current, which is, for example, a switch such as a relay, a resistor, a coil, etc. Accordingly, since the number of switches disposed in the outdoor unit 3 can be reduced, the air conditioner 101 can be manufactured at low cost without an increase in size.

As described above, according to the first embodiment, the air conditioner 101 shuts off power supply to the outdoor controller 15 during standby in order to reduce standby power consumption of the outdoor unit 3, and when starting the outdoor unit 3, the air conditioner 101 allows an inrush current to flow through the outdoor smoother 11 via the first switch 7 of the indoor unit 2 and the resistor 13 provided at a subsequent stage to the third switch 12 of the outdoor unit 3. With this configuration, the air conditioner 101 omits a switch dedicated to preventing an inrush current, and reduces standby power consumption as well. As a result, the air conditioner 101 can be downsized, and thus the air conditioner 101 can be made at low cost.

Second Embodiment

Next, a second embodiment will be described using FIGS. 5 and 6. While the first embodiment has been described taking an example in which there is one indoor unit 2, the second embodiment will be described taking an example in which there are two or more indoor units.

Figure 5:
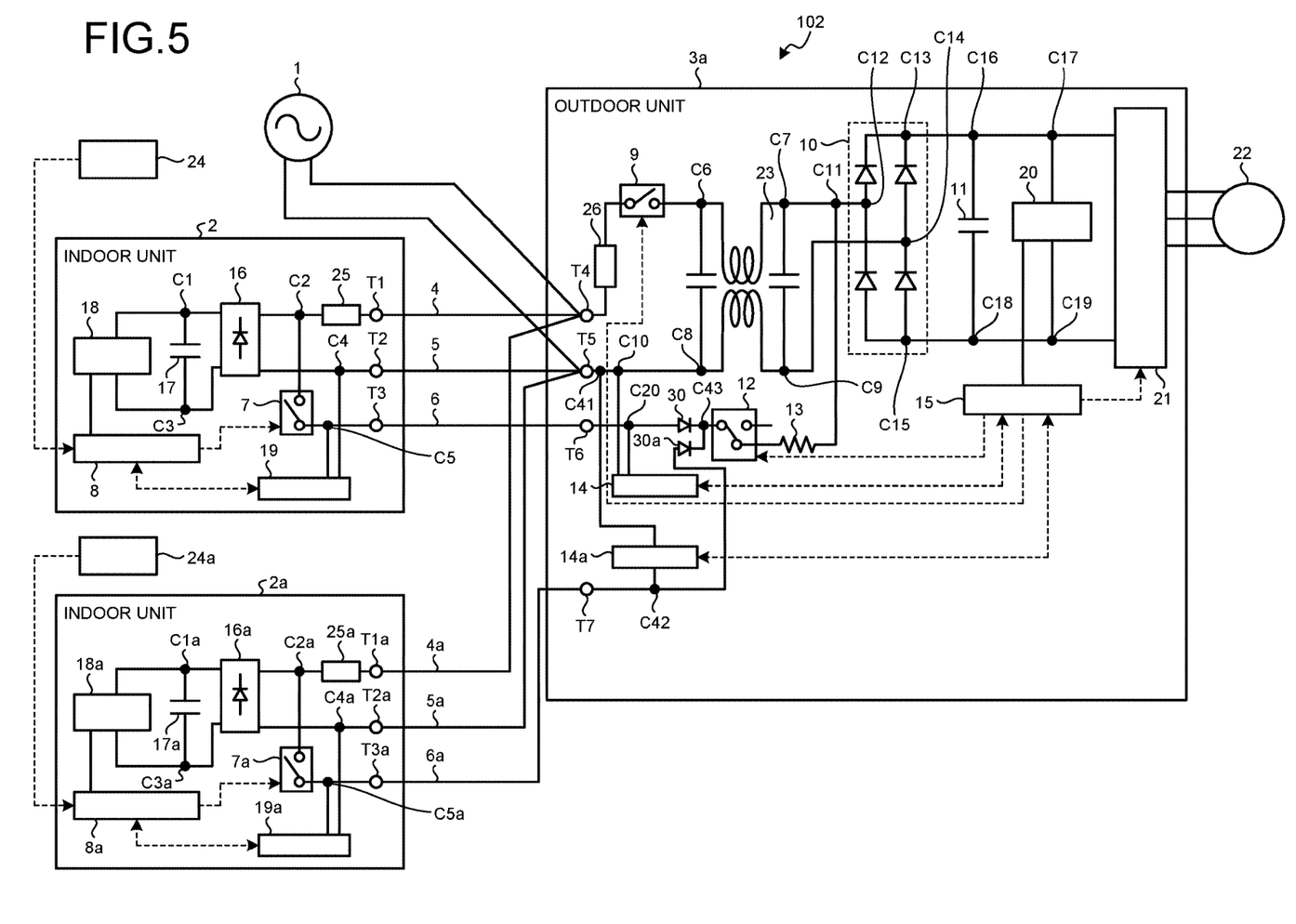
FIG. 5 is a diagram illustrating an example configuration of an air conditioner according to a second embodiment.

FIG. 5 is a diagram illustrating an example configuration of an air conditioner according to the second embodiment. Among components in FIG. 5, components implementing the same functions as those of the air conditioner 101 of the first embodiment illustrated in FIG. 1 are denoted by the same reference signs, and redundant description will be omitted.

An air conditioner 102 includes indoor units 2 and 2a and an outdoor unit 3a. In the air conditioner 102, the indoor unit 2 and the outdoor unit 3a are connected to each other, and the indoor unit 2a and the outdoor unit 3a are connected to each other. In the air conditioner 102, the indoor unit 2 and the outdoor unit 3a are connected to each other by the power supply line 4, the common line 5, and the signal line 6, and the indoor unit 2a and the outdoor unit 3a are connected to each other by a power supply line 4a, a common line 5a, and a signal line 6a.

The indoor unit 2a has the same configuration as the indoor unit 2. Specifically, the indoor unit 2a includes a first switch 7a, an indoor controller 8a, an indoor rectifier 16a, an indoor smoother 17a, an indoor control power generator 18a, an indoor communication circuit 19a, and an indoor current fuse 25a.

The first switch 7a, the indoor controller 8a, the indoor rectifier 16a, and the indoor smoother 17a have the same functions and execute the same operations as the first switch 7, the indoor controller 8, the indoor rectifier 16, and the indoor smoother 17, respectively. In addition, the indoor control power generator 18a, the indoor communication circuit 19a, and the indoor current fuse 25a have the same functions and execute the same operations as the indoor control power generator 18, the indoor communication circuit 19, and the indoor current fuse 25, respectively. Connection points C1a to C5a are arranged at the same positions as the connection points C1 to C5. Further, inside the indoor unit 2a, the components of the indoor unit 2a have the same connection configuration as the components of the indoor unit 2. The indoor controller 8a is connected to a remote controller 24a.

The indoor unit 2a also includes terminals T1a to T3a. The terminals T1a to T3a are the same terminals as the terminals T1 to T3. The terminal T1a of the indoor unit 2a is connected to the terminal T4 of the outdoor unit 3a, and the terminal T2a of the indoor unit 2a is connected to the terminal T5 of the outdoor unit 3a. In addition, the terminal T3a of the indoor unit 2a is connected to the terminal T7 of the outdoor unit 3a.

The outdoor unit 3a includes a first reverse element diode 30, a second reverse element diode 30a, an outdoor communication circuit 14a, and a terminal T7 in addition to the components of the outdoor unit 3.

The terminal T4 of the outdoor unit 3a is connected to the terminal T1 via the power supply line 4, and is connected to the terminal T1a via the power supply line 4a. The terminal T5 of the outdoor unit 3a is connected to the terminal T2 via the common line 5 and is connected to the terminal T2a via the common line 5a. The terminal T6 of the outdoor unit 3a is connected to the terminal T3 via the signal line 6, and the terminal T7 of the outdoor unit 3a is connected to the terminal T3a via the signal line 6a.

In the outdoor unit 3a, a connection point C41 is provided in a line that connects the terminal T5 and the connection point C10 to each other. In addition, a connection point C43 is provided in a line that connects the connection point C20 and the third switch 12 to each other.

The first reverse element diode 30 is disposed in a line that connects the connection point C43 and the connection point C20 to each other. A connection point C42 is provided in a line that connects the terminal T7 and the connection point C43 to each other. The outdoor communication circuit 14a is connected to the connection points C41 and C42. The second reverse element diode 30a is disposed in a line that connects the connection point C42 and the connection point C43 to each other.

In the outdoor unit 3a, the first reverse element diode 30 has an anode connected to the signal line 6 via the connection point C20, and a cathode connected to the normally closed contact of the third switch 12 via the connection point C43.

The second reverse element diode 30a has an anode connected to the connection point C42 and a cathode connected to the connection point C43. Thus, the anode of the second reverse element diode 30a is connected to the signal line 6a via the connection point C42. In addition, the cathode of the second reverse element diode 30a is connected to the signal line 6 via the connection points C43 and C20, and is connected to the normally closed contact of the third switch 12 via the connection point C43.

The outdoor communication circuit 14a has the same function and executes the same operation as the outdoor communication circuit 14. The outdoor communication circuit 14a of the outdoor unit 3a communicates with the indoor communication circuit 19a via the common line 5a and the signal line 6a. Thus, the outdoor unit 3a communicates with the indoor unit 2a via the common line 5a and the signal line 6a.

Next, the operation of the air conditioner 102 will be described. The operation of the air conditioner 102 will be hereinbelow described focusing on a difference between the operation of the air conditioner 102 according to the second embodiment and the operation of the air conditioner 101 according to the first embodiment.

The air conditioner 102 and the air conditioner 101 are different in that the air conditioner 102 includes the multiple indoor units. The air conditioner 102 and the air conditioner 101 are also different in that the outdoor unit 3a of the air conditioner 102 includes the first reverse element diode 30, the second reverse element diode 30a, the outdoor communication circuit 14a, and the terminal T7.

Figure 6:
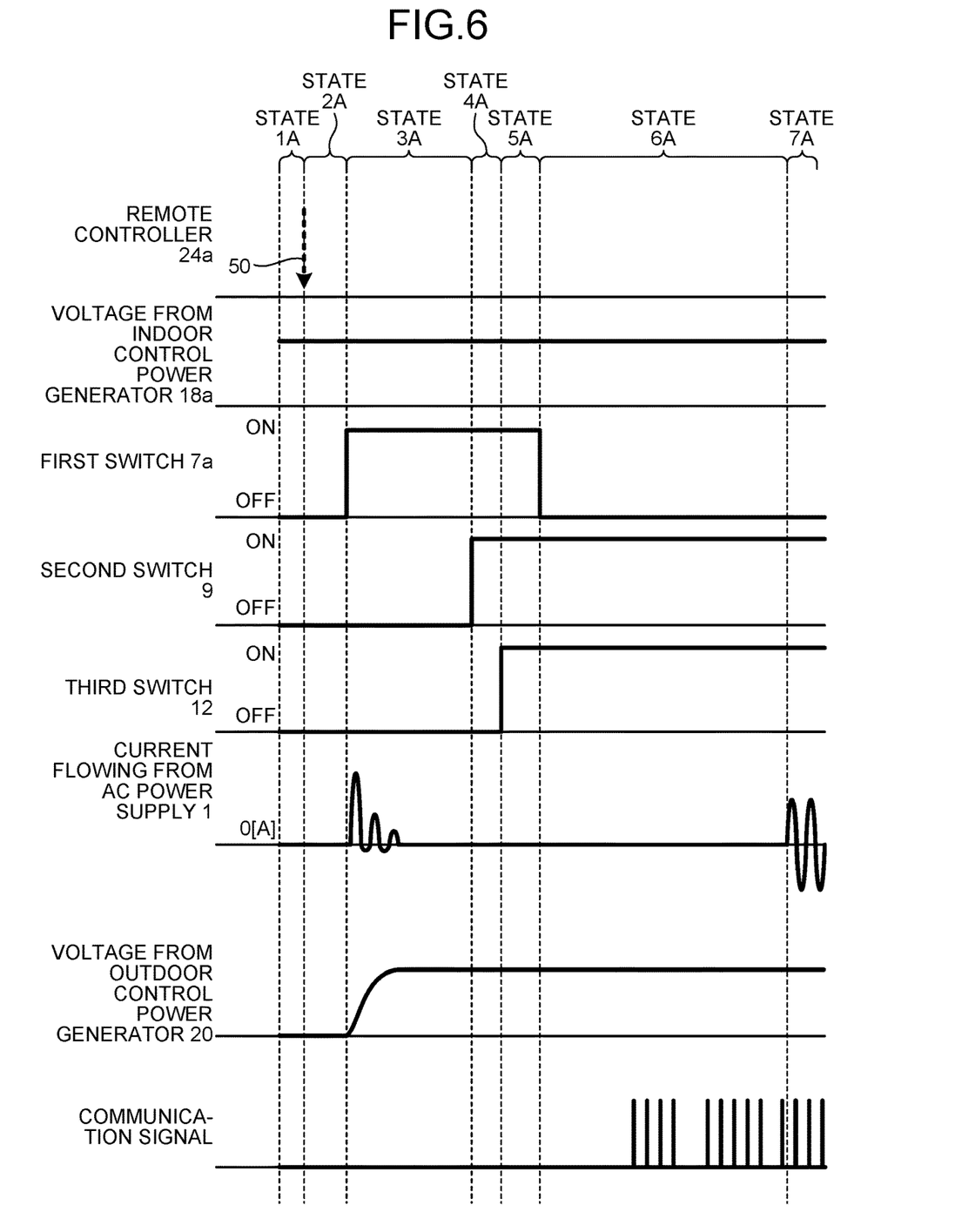
FIG. 6 is a time chart illustrating an operation procedure of the air conditioner according to the second embodiment.

FIG. 6 is a time chart illustrating an operation procedure of the air conditioner according to the second embodiment. The operation of the air conditioner 102 observed when the outdoor unit 3a is started and operated from a standby mode of the air conditioner 102 will be described herein.

Consider the situation where the user operates the remote controller 24a of the indoor unit 2a. In FIG. 6, the operations of the air conditioner 102 in states 1A and 2A are the same as the operations of the air conditioner 101 in the states 1 and 2 described in the first embodiment, and thus their description will be omitted.

The air conditioner 102 transitions to a state 3A after the state 2A. This state 3A indicates the following situations (3A-1) to (3A-4).

(3A-1) The indoor controller 8a turns on the first switch 7a of the indoor unit 2a.

That is, the indoor controller 8a short-circuits the power supply line 4a and the signal line 6a. As a result, an inrush current flows in the following path.

The current flows through the AC power supply 1, the power supply line 4a, the indoor current fuse 25a of the indoor unit 2a, the first switch 7a of the indoor unit 2a, the signal line 6a, the second reverse element diode 30a, the third switch 12 of the outdoor unit 3a, the resistor 13, the outdoor rectifier 10, the outdoor smoother 11, the outdoor rectifier 10, the common line 5 side of the noise filter 23, and the AC power supply 1 in this order, such that the outdoor smoother 11 is charged.

However, unlike the case of the air conditioner 101, in the air conditioner 102, no current flows when the current phase of the AC power supply 1 is opposite (opposite phase). This is because the air conditioner 102 includes the second reverse element diode 30a.

(3A-2) to (3A-4) in the state 3A are the same as (3-2) to (3-4) described in the first embodiment, and thus their description will be omitted. In addition, the operations of the air conditioner 102 in states 4A to 7A are the same as the operations of the air conditioner 101 in the states 4 to 7 described in the first embodiment, and thus their description will be omitted.

An effect brought by the fact that the air conditioner 102 includes the first reverse element diode 30 and the second reverse element diode 30a will be described herein. The anode of the first reverse element diode 30 is connected to the signal line 6 and the outdoor communication circuit 14. In addition, the anode of the second reverse element diode 30a is connected to the signal line 6a and the outdoor communication circuit 14a.

Communication between the indoor unit 2 and the outdoor unit 3a and communication between the indoor unit 2a and the outdoor unit 3a are individually performed. Thus, in a case where the first reverse element diode 30 and the second reverse element diode 30a are not provided in the outdoor unit 3a, the signal line 6 and the signal line 6a will have the same potential. In this case, as the outdoor unit 3a fails to detect a potential difference of signals between the outdoor unit 3a and the indoor units 2 and 2a via the communication circuit, the outdoor unit 3a fails to generate a potential difference and, as a result, fails to perform communication with the indoor units 2 and 2a. Accordingly, the first reverse element diode 30 and the second reverse element diode 30a are necessary when the multiple indoor units 2 and 2a are connected to the outdoor unit 3a.

The resistance value of the resistor 13 is set so that an inrush current flowing when the first switch 7 or the first switch 7a is turned on is equal to or lower than the allowable current of the first reverse element diode 30 and the second reverse element diode 30a. When the resistance value of the resistor 13 is set large, the first reverse element diode 30 and the second reverse element diode 30a having small current capacity can be selected. Meanwhile, when the resistance value of the resistor 13 is set small, the time required to charge the outdoor smoother 11 can be shortened.

Note that, while the second embodiment has been described as to the air conditioner 102 including the two indoor units 2 and 2a, the air conditioner 102 may include three or more indoor units. In this case, the air conditioner 102 includes the same number of outdoor communication circuits as the number of indoor units provided.

When the air conditioner 102 includes three or more indoor units, each indoor unit is also connected to a power supply line, a common line, and a signal line. In addition, each indoor unit is connected to the terminal T4 of the outdoor unit via the power supply line, and is connected to the terminal T5 of the outdoor unit via the common line. Further, the outdoor unit includes signal line terminals for each indoor unit and an outdoor communication circuit for each indoor unit. Each indoor unit is connected to the corresponding signal line terminals of the outdoor unit and the corresponding outdoor communication circuit of the outdoor unit.

As described above, according to the second embodiment, even when the two indoor units 2 and 2a are connected to the outdoor unit 3a, the air conditioner 102 can omit a switch dedicated to preventing an inrush current as in the air conditioner 101. As a result, the air conditioner 102 can be downsized, and thus the air conditioner 102 can be made at low cost.

In addition, since the outdoor unit 3a of the air conditioner 102 includes the first reverse element diode 30 and the second reverse element diode 30a, the outdoor unit 3a can communicate with the indoor units 2 and 2a even when the two indoor units 2 and 2a are connected to the outdoor unit 3a.

The hardware configurations of the indoor controller 8 of the air conditioners 101 and 102, the indoor controller 8a of the air conditioner 102, and the outdoor controller 15 included in the air conditioners 101 and 102 will be described herein. Since the hardware configurations of the indoor controllers 8 and 8a and the outdoor controller 15 are the same, the hardware configuration of the outdoor controller 15 will be described here.

The outdoor controller 15 is implemented by processing circuitry. The processing circuitry may be a processor and a memory that execute a program stored in the memory, or may be dedicated hardware.

Figure 7:
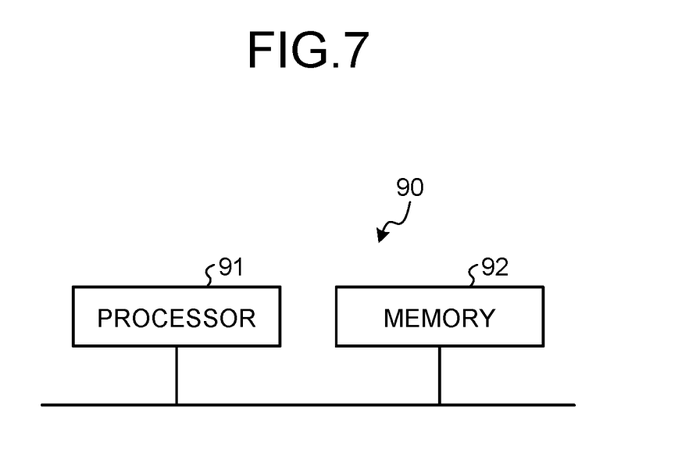
FIG. 7 is a diagram illustrating an example configuration of processing circuitry of the air conditioner according to the first and second embodiments in a case where the processing circuitry is implemented by a processor and a memory.

FIG. 7 is a diagram illustrating an example configuration of processing circuitry in a case where the processing circuitry of the air conditioner according to the first and second embodiments is implemented by a processor and a memory. The outdoor controller 15 can be implemented by a control circuit 90, that is, a processor 91 and a memory 92 illustrated in FIG. 7.

The processor 91 is a central processing unit (CPU, may also be referred to as a central processor unit, a processor unit, an arithmetic unit, a microprocessor, a microcomputer, a processor, or a digital signal processor (DSP)) or a system large scale integration (LSI). The memory 92 can be exemplified by a nonvolatile or volatile semiconductor memory such as a random access memory (RAM), a read only memory (ROM), a flash memory, an erasable programmable read only memory (EPROM), or an electrically erasable programmable read-only memory (EEPROM, registered trademark). The memory 92 is not limited to these, and may be a magnetic disk, an optical disk, a compact disk, a mini disk, or a digital versatile disc (DVD).

The memory 92 stores a program for executing the function of the outdoor controller 15. The processor 91 executes processing by the outdoor controller 15 by reading and executing a program stored in the memory 92. To put it differently, the program stored in the memory 92 causes a computer to execute multiple commands corresponding to the procedure or method of the outdoor controller 15. The memory 92 is also used as a temporary memory used when the processor 91 executes various processes.

The program to be executed by the processor 91 may be a computer program product having a computer-readable and non-transitory recording medium including multiple computer-executable commands for performing data processing.

Figure 8:
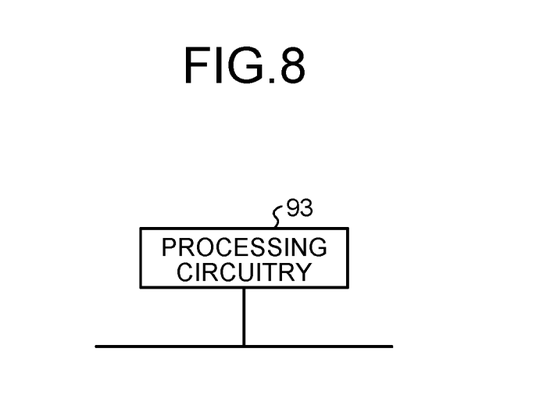
FIG. 8 is a diagram illustrating an example configuration of the processing circuitry of the air conditioner according to the first and second embodiments in a case where the processing circuitry is configured by dedicated hardware.

FIG. 8 is a diagram illustrating an example configuration of the processing circuitry of the air conditioner according to the first and second embodiments in a case where the processing circuitry is configured by dedicated hardware. A processing circuitry 93 corresponds to, for example, a single circuit, a composite circuit, a programmed processor, a parallel programmed processor, an application specific integrated circuit (ASIC), a field-programmable gate array (FPGA), or a combination of these. Note that, some of the functions of the outdoor controller 15 may be implemented by dedicated hardware, and others may be implemented by software or firmware.

The configurations described in the above embodiments are an example, and can be combined with another known technique, can be combined with each other, and can be partly omitted or changed without departing from their gist.

The invention claimed is:

1. An air conditioner including
an indoor unit and an outdoor unit,
the indoor unit and the outdoor unit being connected to each other by three cores made up of a power supply line, a common line, and a signal line,
the indoor and outdoor units being powered by a power supply via the power supply line and the common line,
the power supply being connected to one of the outdoor unit and the indoor unit, wherein
the indoor unit includes:
a first switch to open and close a connection between the power supply line and the signal line; and
an indoor controller to operate the first switch to supply an AC voltage from the power supply between the signal line and the power supply line,
the outdoor unit includes:
a second switch to open and close a connection between the power supply line and the outdoor unit;
a rectifier, connected to the second switch through at least a first connection point, to rectify the AC voltage;
a smoother to smooth an output of the rectifier;
a third switch to connect the signal line and a resistor to each other when the third switch is in an off state, and be open when the third switch is in an on state, the resistor being connected at one end to the first connection point; and
an outdoor controller to control the second switch and the third switch, and
in starting the outdoor unit from a standby mode into operation, the indoor controller and the outdoor controller turn on the first switch with the third switch in the off state to thereby allow an inrush current to flow through the smoother of the outdoor unit via the indoor unit for charging the smoother and, after charging the smoother, turn on the second switch and subsequently turn off the first switch and turn on the third switch.

2. The air conditioner according to claim 1, wherein the first switch and the second switch are A-contact relays, and
the third switch is a C-contact relay.

3. The air conditioner according to claim 1, wherein the first switch has tolerance for an inrush current flowing through the smoother of the outdoor unit.

4. The air conditioner according to claims 1, wherein the indoor unit further includes a fuse connected at one end to the power supply line and connected at another end to the first switch, and
the fuse does not blow even when an inrush current flowing through the smoother of the outdoor unit flows, and blows when a current exceeding an allowable current of the indoor unit flows.

5. The air conditioner according to claim 1, further comprising a noise filter connected between the second switch and the first connection point, which precedes the rectifier to reduce normal mode noise and common mode noise, wherein the noise filter includes an X capacitor.

6. The air conditioner according to claim 1, further comprising:

at least one additional indoor unit, wherein each additional indoor unit and the outdoor unit are connected to each other by an additional three cores made up of an additional power supply line, an additional common line, and an additional signal line, the outdoor unit further includes reverse element diodes each having an anode connected to one of the signal line and one additional signal line and a cathode connected to a normally closed contact of the third switch, a number of the reverse element diodes being the same as a total number of the indoor unit and the at least one additional indoor unit, and the signal line and each additional signal line connected to indoor unit and the at least one additional indoor unit are each connected to a respective reverse element diode.

7. The air conditioner according to claim 6, wherein the resistor has a resistance value such that the inrush current is equal to or lower than an allowable current through the reverse element diodes.

* * * * *